R. McCALMONT.
AUTOMOBILE JACK TRUCK.
APPLICATION FILED APR. 15, 1912.
1,134,211.
Patented Apr. 6, 1915.
5 SHEETS—SHEET 1.
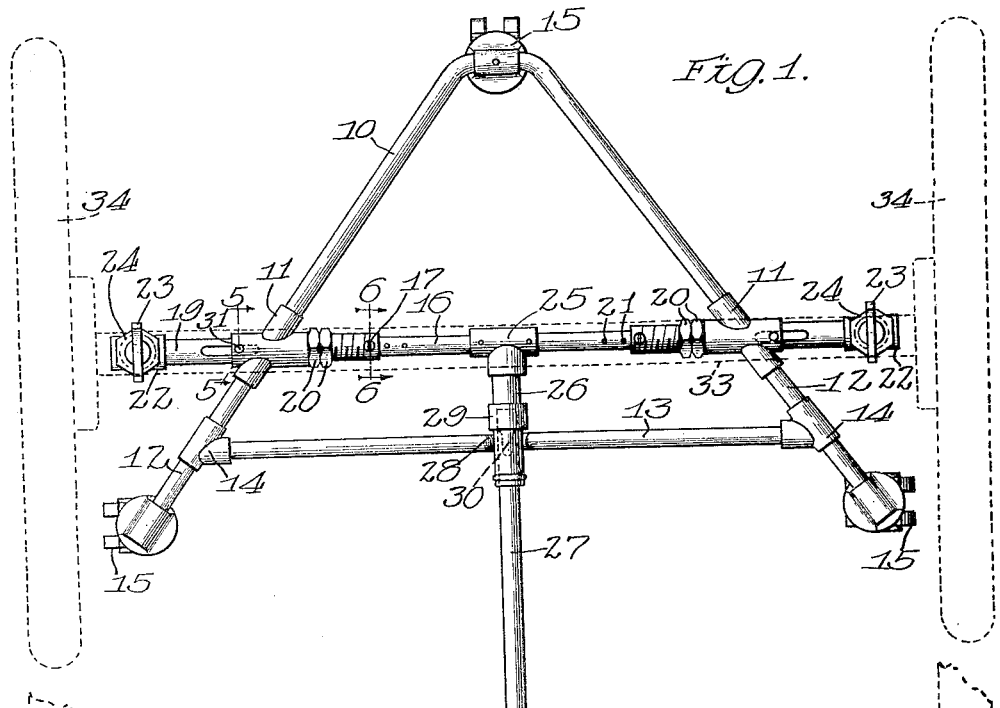
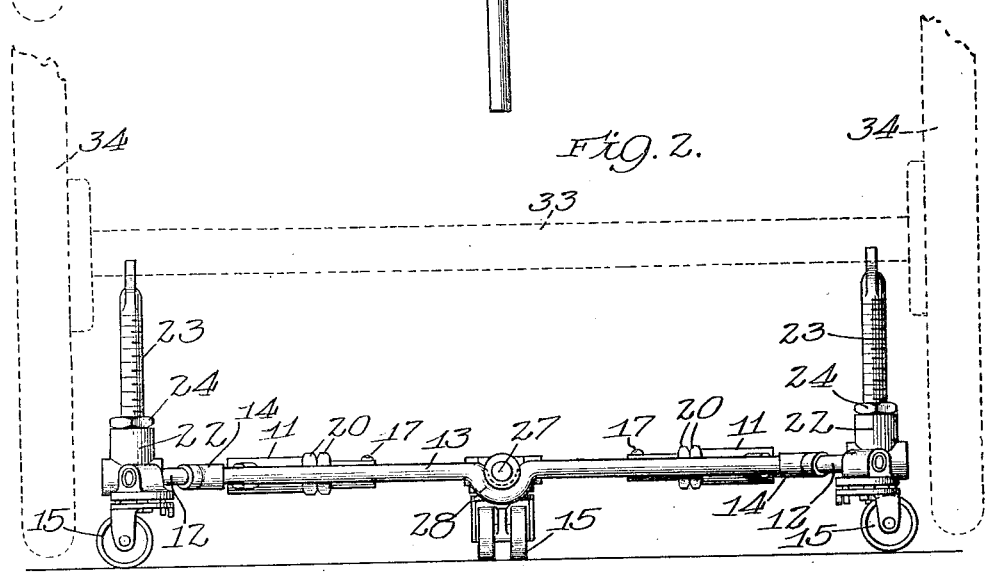

R. McCALMONT.
AUTOMOBILE JACK TRUCK.
APPLICATION FILED APR. 15, 1912.

1,134,211.

Patented Apr. 6, 1915.
5 SHEETS—SHEET 2.

Witnesses:

Inventor:
Robert McCalmont
by O. B. Barnett
Atty.

THE NORRIS PETERS CO., PHOTO-LITHO., WASHINGTON, D. C.

R. McCALMONT.
AUTOMOBILE JACK TRUCK.
APPLICATION FILED APR. 15, 1912.
1,134,211.
Patented Apr. 6, 1915.
5 SHEETS—SHEET 3.
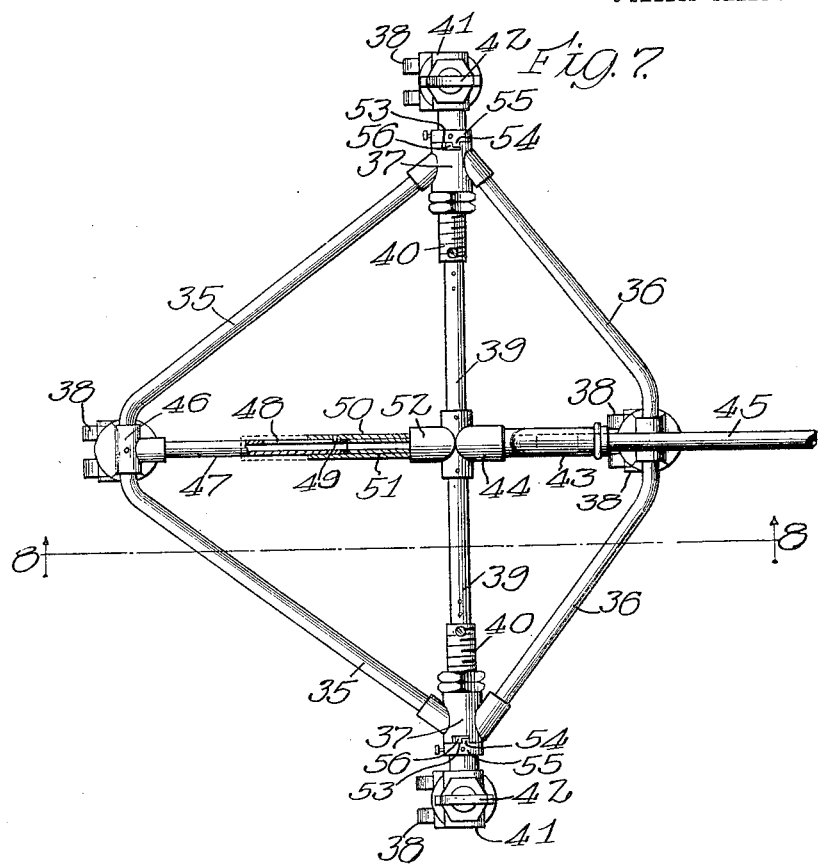
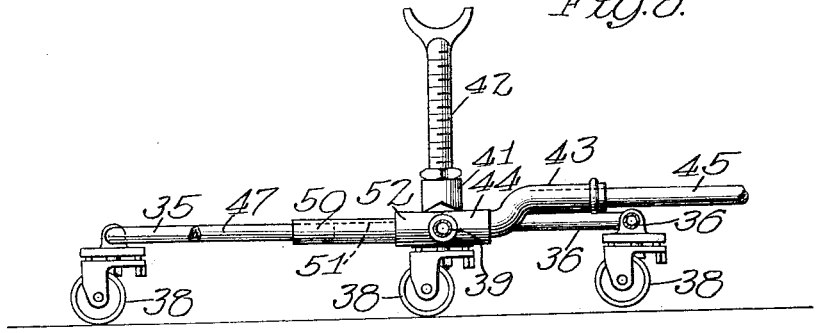
Witnesses.
Inventor:
Robert McCalmont

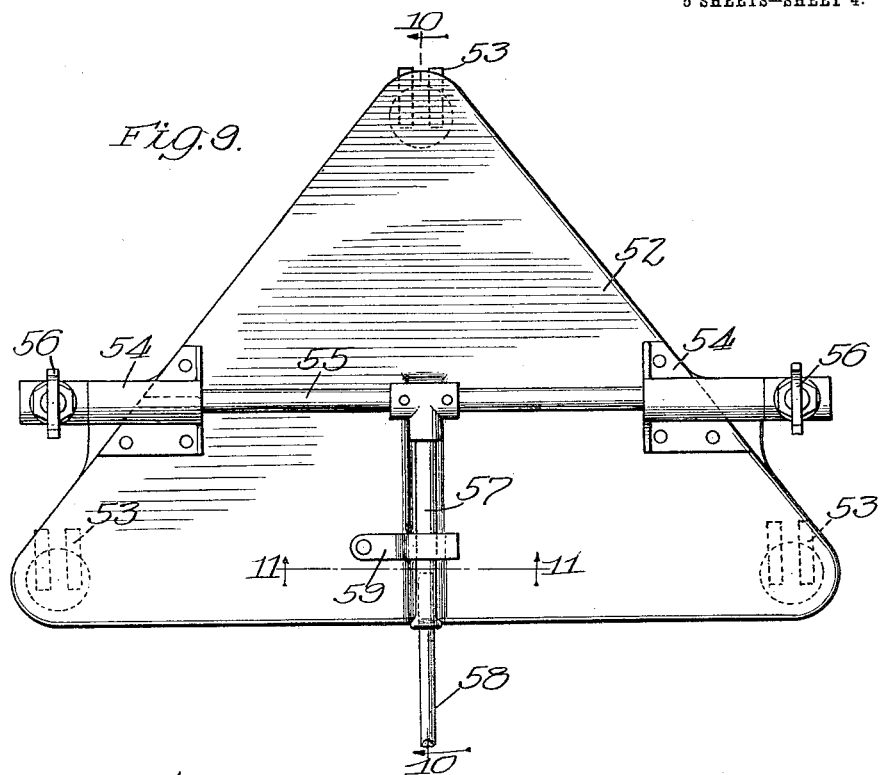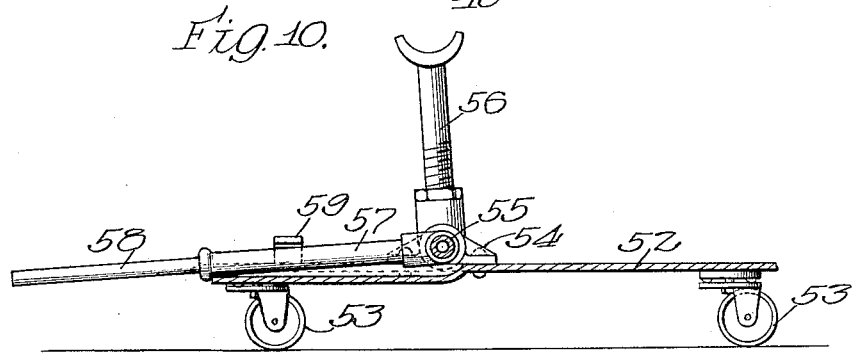

R. McCALMONT.
AUTOMOBILE JACK TRUCK.
APPLICATION FILED APR. 15, 1912.
1,134,211.
Patented Apr. 6, 1915.
5 SHEETS—SHEET 5.
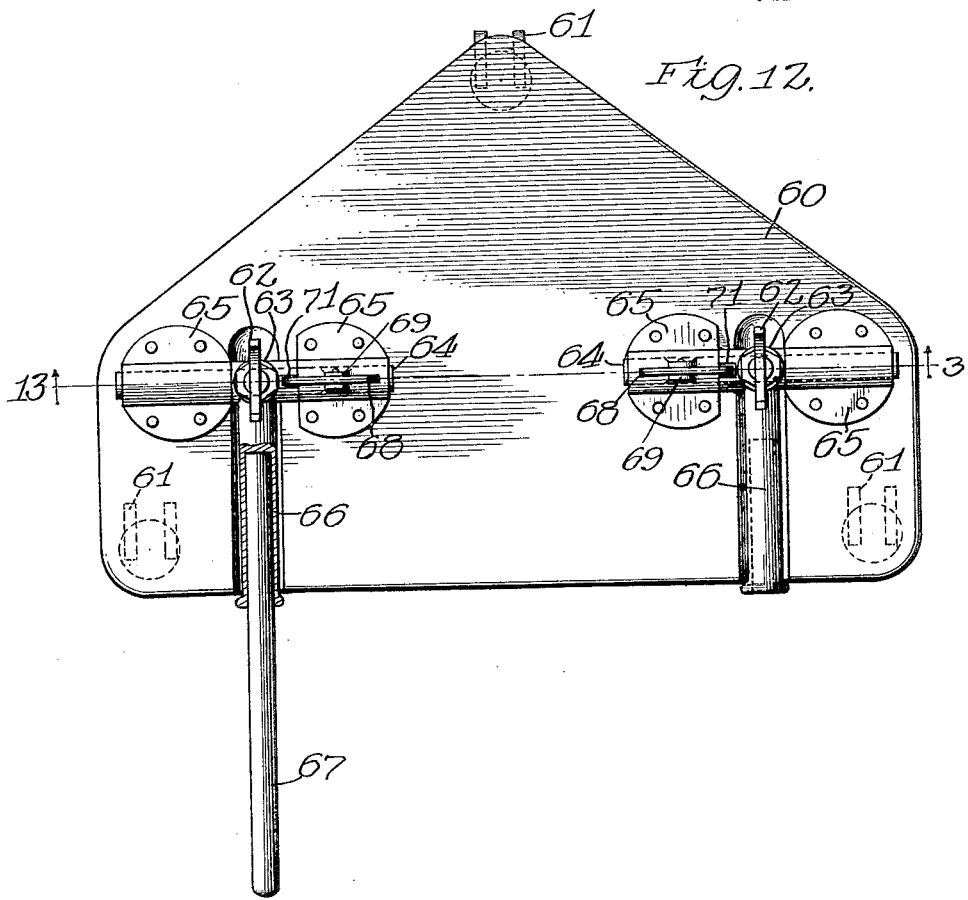
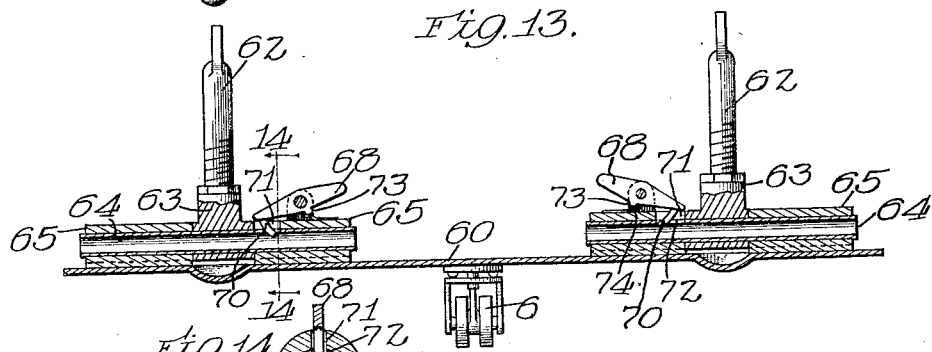
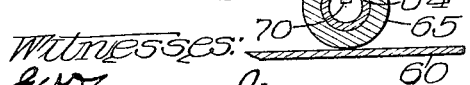

UNITED STATES PATENT OFFICE.

ROBERT McCALMONT, OF FRANKLIN, PENNSYLVANIA.

AUTOMOBILE JACK-TRUCK.

1,134,211.  Specification of Letters Patent.  Patented Apr. 6, 1915.

Application filed April 15, 1912.  Serial No. 691,019.

*To all whom it may concern:*

Be it known that I, ROBERT MCCALMONT, a citizen of the United States, residing at Franklin, in the county of Venango and State of Pennsylvania, have invented certain new and useful Improvements in Automobile Jack-Trucks, of which the following is a specification.

My invention relates to jack trucks for automobiles or other vehicles, and the invention has for its object to provide a device of this character of novel form and construction which shall be simple, strong and durable, cheaply manufactured and which can be readily applied to the vehicle axle to raise and stably support the same in such manner that the vehicle may, if desired, be moved from place to place.

The invention is illustrated in a preferred embodiment, and in a modification thereof, in the accompanying drawings, wherein—

Figure 3:
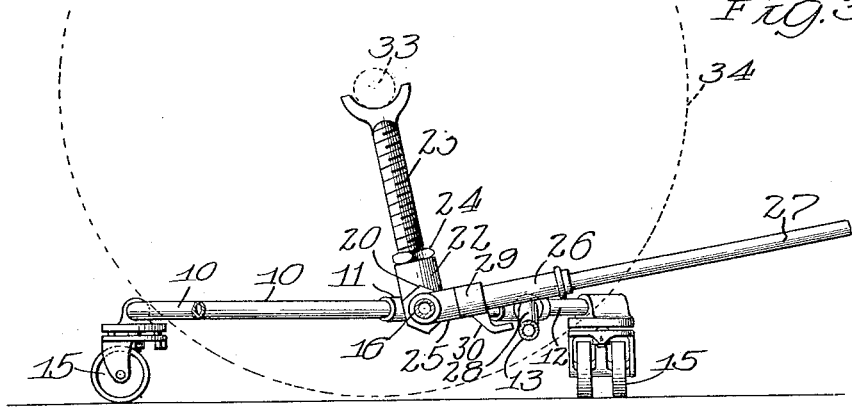
Figure 4:
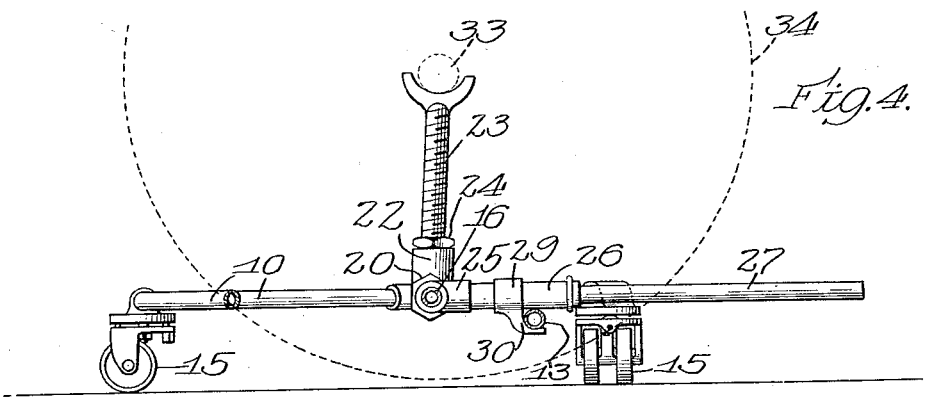
Figure 5:
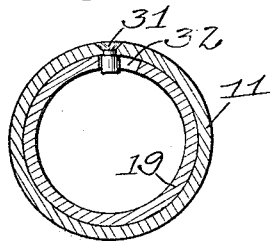
Figure 6:
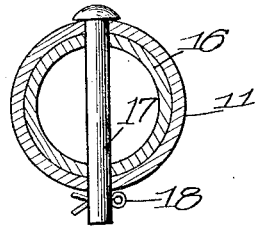

Figure 1 is a plan view of one form of jack truck, the vehicle axle and wheels being shown in dotted lines. Fig. 2 is an end view of the same. Fig. 3 a longitudinal sectional view showing the device in the position which it assumes when first applied to the vehicle axle. Fig. 4 is a similar view showing the device in its operative or supporting position. Figs. 5 and 6 are sectional views, on an enlarged scale, taken on respectively lines 5—5 and 6—6 of Fig. 1, looking in the direction of the arrows. Fig. 7 is a plan view of a modified form of device. Fig. 8 is a sectional view taken on line 8—8 of Fig. 7, looking in the direction of the arrows. Fig. 9 is a plan view of another modification. Fig. 10 is a sectional view taken on line 10—10 of Fig. 9, looking in the direction of the arrows; Fig. 11, a similar view taken on line 11—11 of Fig. 9. Fig. 12 is a plan view of another modification; Fig. 13 is a sectional view taken on line 13—13 of Fig. 12, looking in the direction of the arrows, and Fig. 14 is a similar view taken on line 14—14 of Fig. 13.

Like characters of reference indicate like parts in the several figures of the drawings.

Referring first to Figs. 1 to 6 inclusive, the jack truck here shown is composed of a truck or sustaining member and of a rocking member revolubly mounted in bearings on the truck and provided with axle supports adapted to engage the opposite ends of a vehicle axle.

The truck is made up of a preferably triangular framework consisting of the bent piece of tubing 10, the unions 11, 11 which provide bearings for the rocking member, as will be hereinafter described, the lengths of tubing 12, 12, and a connecting bar 13, also of tubing, which is secured to the members 12, 12 by means of the unions 14, 14. This frame work is provided at each corner with wheels or rollers, preferably with the casters 15, which are of familiar construction.

The rocking or jack member of the device is composed of a cross piece, two axle supports and a lever. In order to adjust the device to different widths, the cross piece is preferably made up of a length of tubing 16, to the ends of which are secured, by means of the bolts 17 held in place by cotter pins 18, a pair of sleeves 19 threaded at their inner ends for the locking nuts 20. The member 16 has a series of perforations 21 for the bolts 17 at each end. By this arrangement the effective width of the rocking member may be varied. The sleeves 19 extend through the unions 11 and are provided at their outer ends with standards 22 which are internally threaded to receive the threaded ends of the axle supports 23. The latter are kept at the proper adjustment by locking nuts 24.

The lever for operating the rocking member is preferably, for the sake of convenience, made in two parts, one of which parts is in the form of a socket attached to the cross piece of the rocking member, the other part fitting into this socket. 25 designates a T union secured to the member 16 at its middle, the projecting member 26 of which forms a socket for the extension piece 27. Preferably the cross piece 13 of the truck frame is formed with a bend 28 into which the socket 26 fits when the rocking member is turned to its operative position.

In order to hold the rocking member in operative position and prevent it from dumping the load when the vehicle supported is moved from place to place, I provide a lock which holds the rocking member in substantially rigid relation with the truck frame. This lock may consist of a sliding collar 29 on the socket member 26 provided with a hook 30 which is adapted to extend under the curved portion 28 of the frame member 13.

In order to limit the movement of the rocking member in the opposite direction, I preferably provide a stop consisting, in the construction shown, of a pin 31 in the union 11 which extends into a slot 32 in the sleeve 19. There may, of course, be one of these stops at each end of the rocking member.

The device thus constructed is operated as follows: It is placed under the axle of the vehicle with the rocking member in the position shown in Fig. 3. Pressure on the extension piece 27 turns the rocking member to the position shown in Fig. 4. This raises the axle and lifts the wheels out of contact with the ground. In the drawings 33 designates the axle and 34 the wheels. To lock the parts in the operative position, the collar 29 is slid along the socket 26 until the hook 30 engages the cross piece 13 of the frame. The extension piece 27 may be removed from the socket, so that the jack truck projects little, if any, beyond the end of the vehicle. It will be understood that it is the intention to employ the jack trucks of my invention in pairs, using one for the front axle and one for the rear axle. When a vehicle is thus supported, it may be pushed from place to place.

In Figs. 7 and 8 I have shown a modified form of the invention, in which the weight of the load, instead of being carried by the truck, is borne by the rocking member which comes into contact with the ground, the purpose of the truck being simply to hold the rocking member in its upright position. The truck in this case consists of a frame work made up of the bent pieces of tubing 35 and 36 connected by the unions 37, 37, which latter, as in the case of the other form of device, provide bearings for the rocking member. The framework 35, 36 is provided at each end with a roller, preferably with the caster 38. The rocking member is composed of the length of tubing 39, the sleeves 40, provided with the standards 41, which are internally threaded to receive the threaded ends of the axle supports 42. The lever consists of a piece of tubing 43 secured to the member 39 by the union 44 and of the extension piece 45 which fits into the piece of tubing or socket member 43. To provide a lock to hold the rocking member in its supporting position, a T union 46 is secured to the frame member 35 and secured to the T is a length of pipe 47 formed with a slot 48 which receives a pin 49 on a sleeve 50 slidably arranged on the member 47. The sleeve 50, when moved to its extended position, slides over the end of a piece of pipe 51 secured to the member 52 of union 44. It will be understood that the pipes 47 and 51 are brought into alinement when the rocking member is turned to its supporting position. As a means for limiting the forward movement of the rocking member, the unions 37 are formed with the notches 53 into which project lugs 54 formed on collars 55 which are adjustably secured to the sleeves 40 by means of set screws 56. The form of truck jack shown in Figs. 7 and 8 is applied to the axle in substantially the same manner as illustrated in Figs. 3 and 4. When the extension piece 45 and the axle supports are in the position of the extension piece 27 and the axle supports 23 shown in Fig. 3, the bearing down on the extension piece 45 brings the rocking member into upright position, that of the full lines in Figs. 2 and 4, which raises the axle and lifts the wheels from the ground. By sliding sleeve 50 over the end of the pipe 51, the rocking member is held in substantially rigid relation with the truck frame.

Another modification is shown in Figs. 9 to 11 inclusive. The truck consists of a plate 52 provided with casters 53. On the plate are bearings 54 for the cross piece 55 of the rocking member. The cross piece 55 carries at its extremity the preferably adjustable standards 56. The rocking member is operated by means of a lever which preferably consists of the socket piece 57 and the removable extension piece 58. Any suitable lock may be provided. I have shown a latch 59 pivoted to the plate 52 so that it may be turned over the socket member 57.

In Figs. 12 to 14 inclusive I have shown a modification permitting the ends of the automobile axle to be raised separately. The truck consists, in the preferred form shown, of a metal plate 60 provided on the under side with the casters 61. Each of the standards 62 is screwed into a socket 63 rigidly connected with a piece of tubing 64 which turns in bearings 65, 65. A tubular lever 66 forms a part of the rocking member, being preferably cast integrally with the socket member 63. A single extension piece 67 may be used for rocking both standards. In the construction shown the lock consists of an arm 68 mounted in a fork 69 on one of the bearings 65. The arm is provided with a tongue 70 extending through a slot 71 in the bearing and a slot 72 in the tubular cross piece 64. By forming the under side of the arm 68 with a lug 73 a spring 74 holds the arm 68 in either position.

While I have described several different embodiments of my invention, it will be understood that there might be some change made in the forms, constructions and arrangements employed without departure from my invention. Therefore I do not limit myself to the particulars shown except so far as the same are made specifically limitations on certain of the claims herein.

I claim:

1. In a jack truck the combination with a truck-structure of a rocking member comprising a pair of axle-supports adapted to engage opposite ends of a vehicle axle and a cross-piece rigidly connecting said axle-supports, said rocking member being revolubly mounted on the truck so that the axle-supports when applied to the axle may stand oblique to the vertical, means for turning said rocking member so as to cause said axle-supports to pass through the vertical and assume a position approximating the vertical to raise the vehicle, and means for holding the rocking member in this position.

2. In a jack truck the combination with a truck-structure of a rocking member comprising a pair of axle-supports adapted to engage opposite ends of a vehicle axle and a cross-piece rigidly connecting said axle-supports, said rocking member being revolubly mounted on the truck so that the axle-supports when applied to the axle may stand oblique to the vertical, a lever rigid with said rocking member for turning said rocking member so as to cause said axle-supports to pass through the vertical and assume a position approximating the vertical, and means for holding said rocking member in this position.

3. In a jack truck the combination with a truck-structure of a rocking member comprising a pair of axle-supports adapted to engage opposite ends of a vehicle axle and a cross-piece rigidly connecting said axle-supports, said rocking member being revolubly mounted on the truck so that the axle-supports when applied to the axle may stand oblique to the vertical, and means for turning said rocking member so that said axle-supports assume a position on the other side of the vertical from the first position but at an angle from the vertical less than the angle made by the supports in the first position, said truck being provided with means for supporting the rocking member in the second-named position.

4. In a jack truck the combination with a truck-structure of a rocking member comprising a pair of axle-supports adapted to engage opposite ends of a vehicle axle and a cross-piece rigidly connecting said axle-supports, said rocking member being revolubly mounted on the truck so that the axle-supports when applied to the axle may stand oblique to the vertical and a lever rigid with said rocking member for turning said rocking member so that said axle-supports assume position on the other side of the vertical from the first-named position but at an angle from the vertical less than the angle made by said supports in the first-named position, said truck being provided with a member on which said lever bears to support the rocking member in the second-named position.

5. In a jack truck the combination with a truck-structure of a rocking member comprising a pair of axle-supports adapted to engage opposite ends of a vehicle axle and a cross-piece rigidly connecting said axle-supports, said rocking member being revolubly mounted on the truck so that the axle-supports when applied to the axle may stand oblique to the vertical, means for turning said rocking member so that said axle-supports assume a position on the other side of the vertical from the first position but at an angle from the vertical less than the angle made by the supports in the first position, said truck being provided with means for supporting the rocking member in the second-named position, and a locking device for holding the rocking member against accidental displacement from the last-named position.

6. In a jack truck the combination with a truck-structure of a rocking member comprising a pair of axle-supports adapted to engage opposite ends of a vehicle axle and a cross-piece rigidly connecting said axle-supports, said rocking member being revolubly mounted on the truck so that the axle-supports when applied to the axle may stand oblique to the vertical, stops to limit the angular movement of the rocking member in the direction away from the vertical, and means for turning said rocking member so as to cause said axle-supports to assume a position on the opposite side of the vertical, said truck-structure being provided with means for holding the rocking member on this side of the vertical at an angle less than the angle which it assumes in the first-named position.

7. In a jack truck the combination with a truck-structure provided with rollers at its corners, of a rocking member revolubly mounted on the truck-structure and comprising a pair of axle-supports adapted to engage opposite ends of a vehicle axle, a cross-piece rigidly connecting the axle-supports and a lever rigidly connected with said cross-piece, stops for limiting the angular movement of the rocking member in one direction which permit the axle-supports to assume a position oblique to the vertical, and means against which said lever bears when said rocking member is rocked through the vertical in the other direction which supports the same with the axle-supports at an angle to the vertical less than the angle which they assume in the first-named position.

ROBERT McCALMONT.

Witnesses:
O. L. BLEAKLEY,
RALPH ALEXANDER.